B. M. Nyce.

Preserving Fruits.

№ 2,036.

Reissued July 25. 1865.

Witnesses:

W. H. Burridge

J. Holmes

Inventor:

Benj. M. Nyce

UNITED STATES PATENT OFFICE.

BENJAMIN M. NYCE, OF CLEVELAND, OHIO.

IMPROVEMENT IN HOUSES FOR PRESERVING FRUIT, &c.

Specification forming part of Letters Patent No. 31,977, dated November 2, 1858; Reissue No. 1,068, dated October 23, 1860; Reissue No. 1,960, dated May 16, 1865; Reissue No. 2,036, dated July 25, 1865.

DIVISION No. 1.

*To all whom it may concern:*

Be it known that I, BENJAMIN M. NYCE, of Cleveland, in the county of Cuyahoga and State of Ohio, (formerly of Kingston, Indiana,) have invented new and useful Improvements in the Process of Preserving Fruits and other Perishable Organic Substances; and I do hereby declare that the following is a full and exact description of the same, reference being had to the accompanying drawings, making part of this specification, in which—

Figure 1:
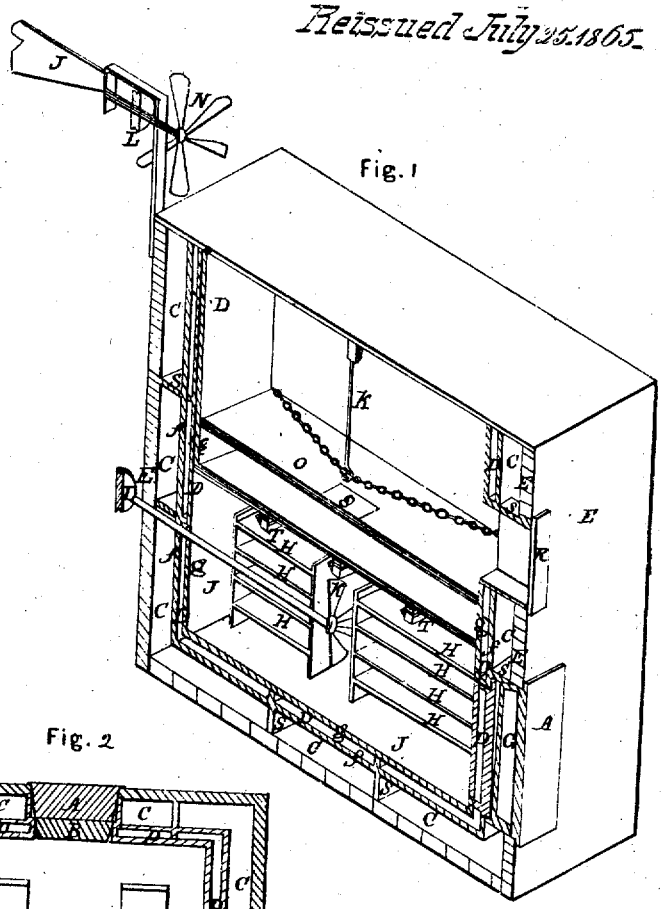
Figure 2:
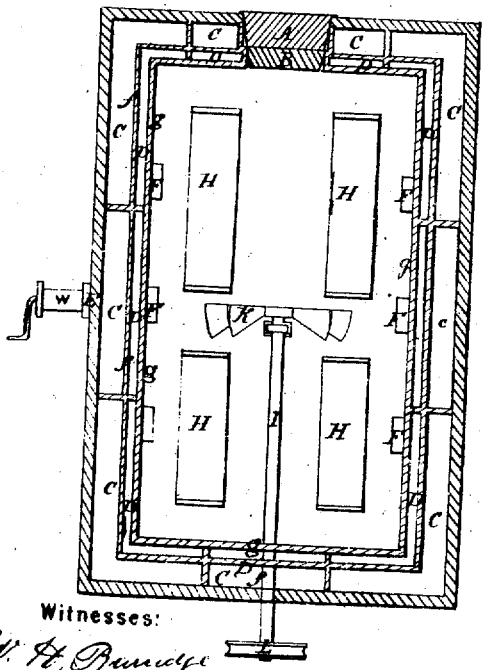
Figure 3:
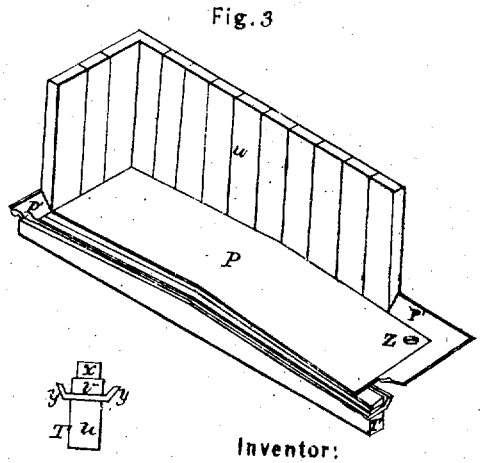

Figure 1 shows by a vertical section and in perspective a room or chambers adapted to my purpose. Fig. 2 is a horizontal section of the ice-floor. Fig. 3 is a perspective view of a portion of the ice-reservoir, together with one of its supporting-beams. Fig. 4 is a transverse section of a supporting-beam.

My invention relates to a means for preserving fruits, vegetables, or other organic perishable substances; and it consists of a room or chambers guarded externally by walls impervious to moisture or other atmospheric changes, and provided at its upper part with an insulated ice-reservoir, and having within its interior a means of mechanical or chemical agitation of the contained air, thus bringing it in contact with absorbents of moisture, with which the chamber is provided—as chlorides of calcium, magnesium, or other similar substances—my purpose being to keep the interior of the chambers at a uniform temperature of about 34½° Fahrenheit, and at the same time the contained air to be kept as free as possible from moisture.

The preserving-chambers J should be made practically air-tight and proof against the ingress of moisture and heat, and to this end its walls and floors may be constructed as follows:

E and *g* constitute, respectively, an outer and inner air-tight shell or casing, three or three and a half feet apart, the intervening space being filled with dry chaff, G, short-cut straw, shavings from planing-mills, or other like poor-conducting materials. The outside casing of the walls may be made of brick, the inside of which is plastered and coated with roofing-cement or any material that is air-tight; or it may be made of sheet-iron, the edges of the sheets painted and closely nailed together to upright studding, or it may be made of any other air-tight substance. The ground below the bottom of the building is solid, leveled off even with the foundation-walls, and covered over the entire surface with tar, pitch, asphaltum, or other material impermeable to the entrance of air and moisture from below it.

As dead air, or air without motion, is the most available poor conductor of heat, and as solid substances are all to a greater or less degree good conductors of heat generally in proportion to their density, it follows that no more chaff, shavings, or other solid material should be placed between the outer and inner walls than is needed to keep the air quiet, nor should they be tightly packed, but put in just closely enough to prevent the circulation of the air through them, and no closer.

From the fact that warm air holds a far greater amount of moisture than cold air will be understood the necessity, especially in summer, of an outer air-tight covering of the walls. If this point be not strictly guarded, the warmer air from without, more or less highly charged with moisture, will gradually, but constantly, approach, enter, and mingle with the chaff or other packing near the inside casing, and in consequence of the low temperature would soon deposit moisture in the chaff and generate fermentation, and, passing all around the inside casing of the preserving-chamber, a heating-surface would be thus produced, raising the temperature of said chambers, and melting rapidly the ice above it.

The inside air-tight casing of the chambers J, together with air-tight doors, made also proof against the ingress of heat and moisture, make the entire chamber air-tight when closed up. When filled with fruit, the oxygen of the air is in a few days entirely consumed in its union with the hydrogen and carbon, forming water and carbonic acid in the gradual ripening of the fruit. Seven pounds of carbon and hydrogen from the fruit takes up, as seen from the law of chemical equivalents, all the oxygen contained in one hundred and twenty pounds of air—that is, this amount is consumed in the formation of water and carbonic acid. The fruit is thus nearly all the time completely surrounded by an atmosphere of the nitrogren of the air and carbonic acid, and hence the presence of free oxygen—the great agent of decomposition—is entirely removed. Whatever moisture is present is taken up by the absorbents before mentioned, and the fruit is thus constantly surrounded by an atmosphere at the uniform temperature of 34½° Fahrenheit, that is also free from moisture or free oxygen.

In the chambers J, when filled with fruit, heat is constantly generated, first, by the fermentation of moisture and carbonic acid thrown off in the gradual ripening of the fruit; and, second, by the condensation of moisture by the chlorides or other absorbents. This heat causes the air constantly to ascend to the ice-floor above, where it is chilled and increased in density, and falls to the lower or ground floor, where the moisture is taken up by the chlorides or other absorbents spread out on a surface below the ice-floor forming the upper wall of the chamber. In this way the air is kept dry and cold, and, being composed chiefly of nitrogen and carbonic acid, the elements of destruction are not present with the fruit.

The ice-floor P, to which reference has been made, is constructed of sheet-iron or other metal, so as, while effectually preventing any actual contact of ice with the air of the preserving chamber J, to at the same time afford a free and equal conduction of heat through every portion of the floor. The upper surface of the ice-floor has a slight descent toward one or more discharging pipes, *z*.

P′ is a rim supporting an inner wall, *w*. The ice floor P is supported on transverse beams T, having their upper portion, *x*, metallic, in order that there may be a free and rapid conduction of heat from the preserving-chamber through those parts of the floor in contact with the beams. The lower portion, *u v*, of the beams may be of wood.

*y* is a metallic trough, to receive and conduct off condensed vapor. *o* is a movable air-tight cover, which is made to fit snugly to the sides of the ice-reservoir, so as to insulate its lower portion, containing ice, from its upper portion, which, after placing of the ice-covers *o*, is packed with chaff or other poor conductor. The insulation of the two compartments of the ice-reservoirs may be completed by the application of tarred canvas or other luting to the edge of the cover *o*.

The entrance-passage to the preserving-apartments should be guarded by a series of doors, so that the entrance to or exit from the room can be effected without direct communication between the inner and outer air. These doors should be made double, and packed, with chaff or other poor conductor, and the joints luted with listing saturated with tallow, thus being made air-tight.

Fans K, or other artificial or mechanical means, may be used to agitate the air within the preserving-chamber; but this I do not consider essential, as the slight variation of temperature, from chemical or other cause, produces all the circulation required under ordinary circumstances.

What I claim as my improvement, and desire to secure by Letters Patent, is—

The insulated and cooled preserving chamber J, provided with absorbents of moisture, substantially as set forth, either with or without the agitator K.

BENJN. M. NYCE.

Witnesses:
W. H. BURRIDGE,
A. W. MCCLELLAND.